United States Patent [19]

Inoue

[11] Patent Number: 5,631,743
[45] Date of Patent: May 20, 1997

[54] BROADCAST RECEPTION METHOD AND APPARATUS WHICH CONTROLS RECORDING OF A BROADCAST VIDEO SIGNAL AND DETECTS A CHANGED RECEPTION CHANNEL WITHOUT USING EXTRA MEMORY

[75] Inventor: Hiraku Inoue, Kanagawa, Japan

[73] Assignee: Sony Corporation, Tokyo, Japan

[21] Appl. No.: 666,995

[22] Filed: Jun. 21, 1996

Related U.S. Application Data

[63] Continuation of Ser. No. 276,640, Jul. 18, 1994, abandoned.

[30] Foreign Application Priority Data

Jul. 23, 1993 [JP] Japan .................... 5-182846

[51] Int. Cl.$^6$ ................... H04N 9/79; H04N 7/084
[52] U.S. Cl. ................................. 386/95; 348/473
[58] Field of Search ................ 358/335; 360/69; 369/49; 348/473, 474, 478

[56] References Cited

U.S. PATENT DOCUMENTS

| | | | |
|---|---|---|---|
| 4,706,121 | 11/1987 | Young | 358/142 |
| 4,879,611 | 11/1989 | Fulcui et al. | 360/69 |
| 5,430,552 | 7/1995 | O'Callaghan | 358/335 |
| 5,446,715 | 8/1995 | Satomura | 369/49 |

FOREIGN PATENT DOCUMENTS

| | | |
|---|---|---|
| 0118104 | 9/1984 | European Pat. Off. . |
| 0420123 | 4/1991 | European Pat. Off. . |
| 0492298 | 1/1992 | European Pat. Off. . |
| 0492298 | 7/1992 | European Pat. Off. . |
| WO91/20157 | 12/1991 | WIPO . |

OTHER PUBLICATIONS

Funkschau, vol. 57, No. 25, 6 Dec. 1985, Munchen De pp. 47–51 w. Sommerhauser [Flexibel programmieren mit VPS].

Crutchfield Catalog Winter/Spring '96 Cover & p. 116.

*Primary Examiner*—Thai Q. Tran
*Assistant Examiner*—David R. Vincent
*Attorney, Agent, or Firm*—William S. Frommer; Alvin Sindberbrand

[57] ABSTRACT

A broadcast reception apparatus can detect a changed reception channel without using an extra memory. A signal from an antenna (1) is supplied to a tuner (2), and the tuner (2) is connected with a reception channel preset device (3) and a channel setting device (4). A signal received by the tuner (2) is supplied to a PDC decoder (6) and a decoded television program ID is supplied to a control microcomputer (7). A network code in the television program ID is supplied to a comparator (72), and a network code provided when LUF= "1" is detected is supplied to a memory (73). Compared results are supplied to a controller (74) which sequentially outputs a channel selection control signal to the channel setting device (4) if the compared results do not agree. If the compared results agree, a signal representing the reception channel provided at that time is supplied to a television program reserve circuit (71). A signal from the television program reserve circuit (71) is supplied to a recording circuit (8), thereby a video signal from the tuner (2) or the like being recorded.

9 Claims, 9 Drawing Sheets

BROADCAST RECEPTION METHOD AND APPARATUS WHICH CONTROLS RECORDING OF A BROADCAST VIDEO SIGNAL AND DETECTS A CHANGED RECEPTION CHANNEL WITHOUT USING EXTRA MEMORY

This application is a continuation of application Ser. No. 08/276,640, filed Jul. 18, 1994 now abandoned.

BACKGROUND OF THE INVENTION

1. Field of the Invention

The present invention relates to a Broadcast reception apparatus for receiving a broadcasting signal in which a program ID (identification) code, such as PDC (program delivery control) is inserted.

2. Description of the Related Art

In order to smoothly implement the timer-activated recording (or reserve recording) by a VCR (video cassette recorder), for example, services for superimposing an ID (identification) code of present television broadcasting program in a part of a particular horizontal scanning line of a blanking period of a video signal or a teletext signal are now commercially available on a part of areas in European countries.

In a so-called PDC (program delivery control) system implemented in U.K. and Netherlands, a code signal is provided on a part of a teletext broadcasting. Then, a predetermined program ID called a label is determined in every broadcasting program by using such code signal.

When a broadcasting time of the program, for example, is extended, the program ID is continued so long as the program is continued. Therefore, when such program is recorded by a VCR, the recording can be continued by detecting the program ID so long as the program being recorded is extended.

As shown in FIG. 1 of the accompanying drawings, the program ID called a label in the PDC system includes a broadcast day, a broadcast start time and network codes of broadcast channels. In the example shown in FIG. 1, a television program 1 of the broadcast channel of the network code BBC1 is scheduled to be broadcast from seven o'clock and a television program 2 is scheduled to be broadcast from line o'clock as television broadcast schedules on 10th of November. In that case, the television program ID is set to [11/10 7:00 BBC1] for the television program 1 and [11/10 9:00 BBC1] for the television program 2.

If the broadcast of the television program 1 is extended as shown in FIG. 1A, for example, the television program ID [11/10 7:00 BBC1] is continued during the extended period of the television program 1 as shown in FIG. 1B. Accordingly, when the television program 1 is reserved, for example, the recording of the television program 1 is continued to the end thereof as shown in FIG. 1C by controlling the recording of the VCR on the basis of the detected television program ID. If the television program 2 is reserved, then as shown in FIG. 1D, the recording is started when the television program 1 is ended and the television program 2 is started.

In this way, even when the broadcast time of the television program, for example, is extended, it is possible to accurately record the reserved television program.

In the PDC system, a special code is defined by using impossible time and day. Specifically, [15/0 28:63] is defined as a Cont code indicating a continuity. This code is transmitted instead of the television program ID when the television program ID cannot be transmitted temporarily because of various reasons, such as a trouble of a transmitting apparatus for transmitting the television program ID and a switching processing of a network. Therefore, in the control of the VCR, as shown in FIG. 2, the recording is continued during the transmission of Cont code.

A code [15/0 29:63], for example, is defined as an Int code representing an interruption. The Int code is transmitted when a certain television program is interrupted by other television program, such as news special. Therefore, in the control of the VCR, for example, as shown in FIG. 3, the recording is interrupted during the transmission of Int code, and the recording is resumed when the transmission of the Int code is finished.

A code [15/0 30:63], for example, is defined as an RT/I code representing that the television program is not broadcast. The RT/I code is transmitted during the period in which the television program is not broadcast, such as a period between the television programs and a test pattern broadcast or the like. Therefore, in the control of the VCR, as shown in FIG. 4, when the RT/I code is transmitted, the recording is interrupted.

A code [15/0 31:63], for example, is defined as a TC code representing that a timer control is effected with a priority. The TC code is transmitted when the television program is broadcast on time although the television program ID is not transmitted because of a trouble occurred in the television program ID transmitting apparatus. Therefore, in the control of the VCR, as shown in FIG. 5, when the TC code is transmitted, the recording is carried out in accordance with some suitable means, such as a timer housed in the VCR or the like.

As described above, even when various troubles occur, it is possible to accurately record the reserved television programs.

In the television program ID, the reserved broadcast date and broadcast channel can be changed by means of the transmission of the television program ID. Specifically, in that case, a label update flag (LUF) is set to a part of the television program ID. When the LUF is "1", a television program ID of the changed broadcast date and broadcast channel is transmitted.

Specifically, FIG. 6 shows the case that the television program 1 which is scheduled to be broadcast on the broadcast channel of the network code BBC1 from 11/10 7:00 is changed to a broadcast channel of the network BBC2 on 11/13 7:30. In that case, the television broadcast ID which should become [11/10 7:00 BBC1 LUF=0] becomes [11/13 7:30 BBC2 LUF=1]. Thus, the VCR changes the setting of the reserved recording scheduled in 11/10 7:00 to 8:00 to the setting of the recording scheduled as 11/13 7:30 to 8:30 and is then placed in the standby mode.

FIG. 7 shows the case that the television program of the broadcast channel in the network BBC1 scheduled from 11/10 7:00 to 9:00 is extended by the broadcast channel of the network BBC2. In that case, the television program ID of [11/10 7:00 BBC1 LUF=0], for example, is changed to [11/10 9:01 BBC2 LUF=1] although the transmission of the television program ID is not finished. Thus, the VCR changes the broadcasting channel reserved to the broadcasting channel of the network code BBC1 to the broadcasting channel of the network code BBC2 after 11/10 9:01 and then continues the recording.

Therefore, even when the broadcast date and broadcast channel of the reserved television program are changed, it is possible to accurately record the reserved television program.

In the VCR, however, it is customary that only necessary broadcasting channel is set in the preset means. In that case, a place in which a necessary broadcasting channel is preset in the preset means is not determined so that, when the broadcast channel is changed as described above, it is not possible for the user to know the place where the changed broadcast channel is preset in the preset means.

There is considered a method in which the user designates the preset of the broadcast channel and a microcomputer for control operation is provided with a network code table. This method imposes extra work on the user and needs an extra memory for memorizing the network code table in the microcomputer. Further, it is necessary to change the microcomputer to cope with changes, such as a change of a network code and a newly-established broadcast station.

Furthermore, although there is a method for memorizing network codes when a broadcast channel is preset, it is necessary to provide a memory to memorize network codes in each of the preset means. This method cannot be effected if the network code is not broadcast when the network code is preset in the preset means.

SUMMARY OF THE INVENTION

In view of the aforesaid aspect, it is an object of the present invention to provide a broadcast reception apparatus in which a changed reception channel can be detected with ease without using an extra memory.

According to a first aspect of the present invention, there is provided a broadcast reception apparatus which is comprised of a tuner for receiving a broadcast signal into which a predetermined television program ID is inserted, a detector for detecting the television program ID, a comparator for comparing a detected ID code, a preset means for a reception channel, a channel setting means, and a controller for controlling the broadcast reception apparatus such that, when the television program ID detector detects a change of the reception channel, channels preset in the preset means are sequentially selected by the channel setting means and the preset means to which the changed reception channel is preset is detected by the ID code comparator.

According to a second aspect of the present invention, there is provided a recording apparatus having a broadcast reception apparatus which comprises a tuner for receiving a broadcast signal into which a predetermined television program ID is inserted, a recording circuit for recording a broadcast signal from the tuner, a detector for detecting the television program ID, a comparator for comparing a detected ID code, a preset means for a reception channel, a channel setting means, and a controller for controlling the broadcast reception apparatus such that, when the television program ID detecting means detects a change of the reception channel, channels preset in the preset means are sequentially selected by the channel setting means and the preset means to which the changed reception channel is preset is detected by the ID code comparator.

In accordance with a third aspect of the present invention, there is provided a reception method in a broadcast reception apparatus including a tuner for receiving a broadcast signal into which a predetermined television program ID is inserted, a detector for detecting the television program ID, a comparator for comparing a detected ID code, a preset means for a reception channel, and channel setting means. The reception method comprises the steps of a first step of resetting a housed counter when a destination channel determining processing is started, a second step of detecting a network code of a destination network code, a third step of selecting a reception channel 1 of the preset means, a fourth step of adding "1" to a count value of the housed counter, a fifth step of detecting whether or not a counter value of the housed counter becomes larger than a predetermined value, a sixth step of detecting a television program ID in a received signal when the count value of the housed counter is the predetermined value or smaller, a seventh step of judging television program change information in the television program ID and returning the processing to the fourth step when the television program ID includes the television program change information, an eighth step of determining whether or not the network code of the destination channel and the network code of the television program ID agree with each other if it is determined that the television program ID has no television program change information, and a ninth step of adding "1" to the reception channel if it is determined in the eighth step that the network codes agree and returning the processing to the fourth step.

DETAILED DESCRIPTION OF THE PREFERRED EMBODIMENT

The present invention will now be described with reference to the drawings.

Figure 1:
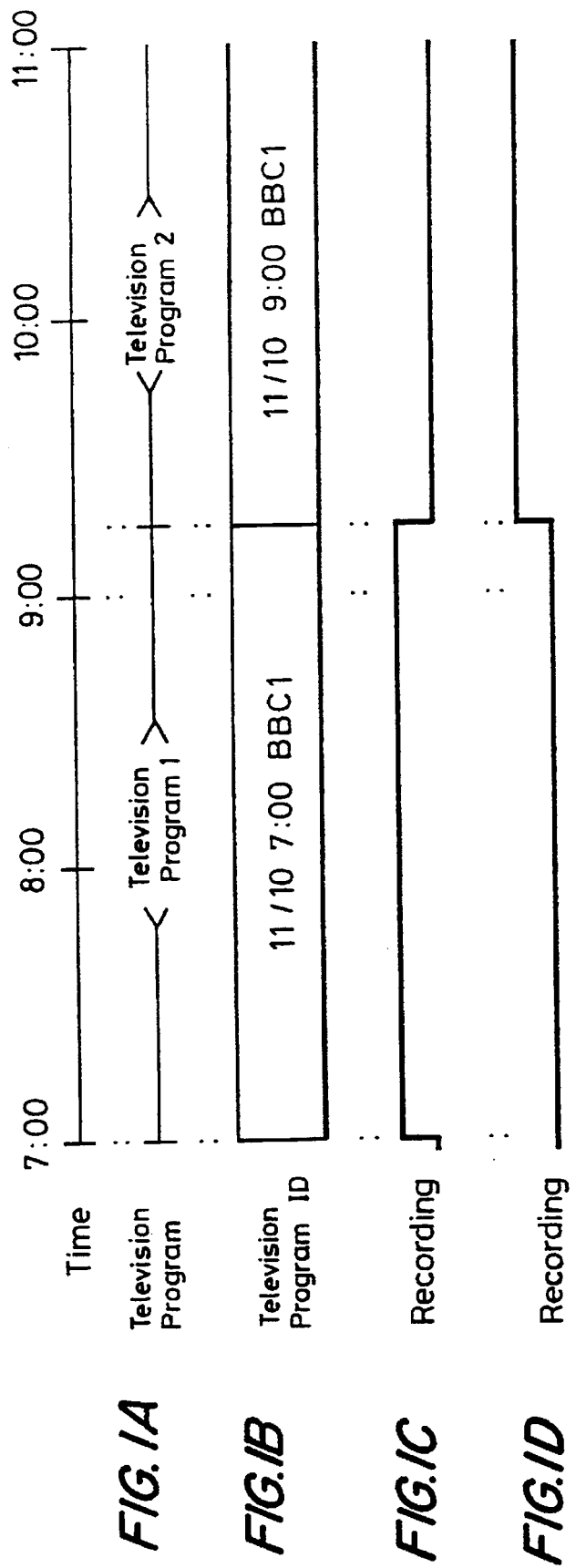
FIGS. 1A to 1D and FIGS. 2 through 7 are schematic diagrams used to explain a program delivery control (PDC) system, respectively.
Figure 2:
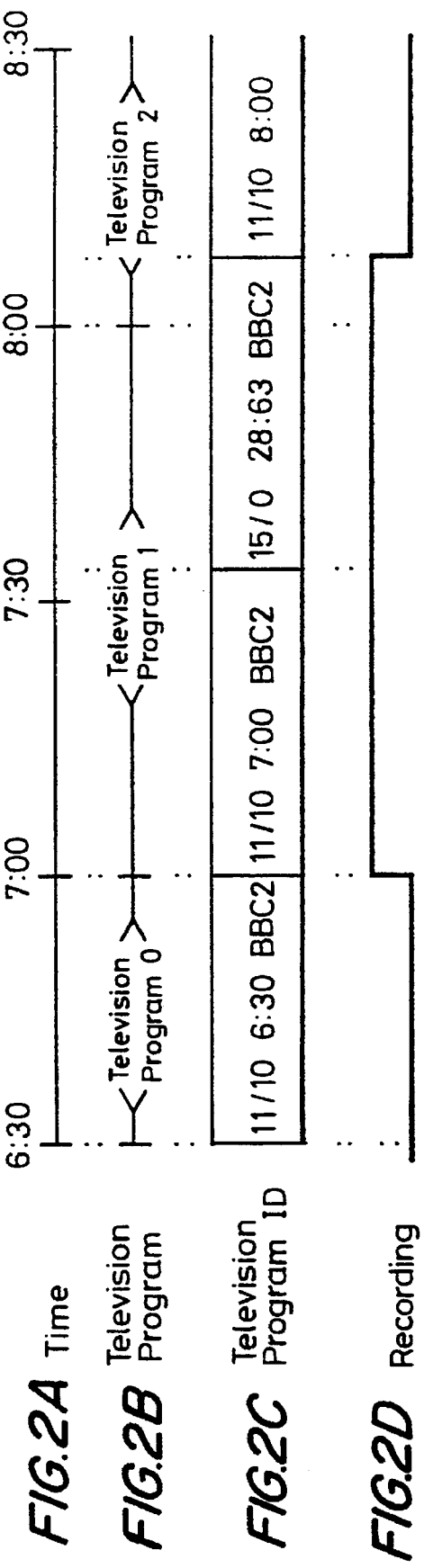
Figure 3:
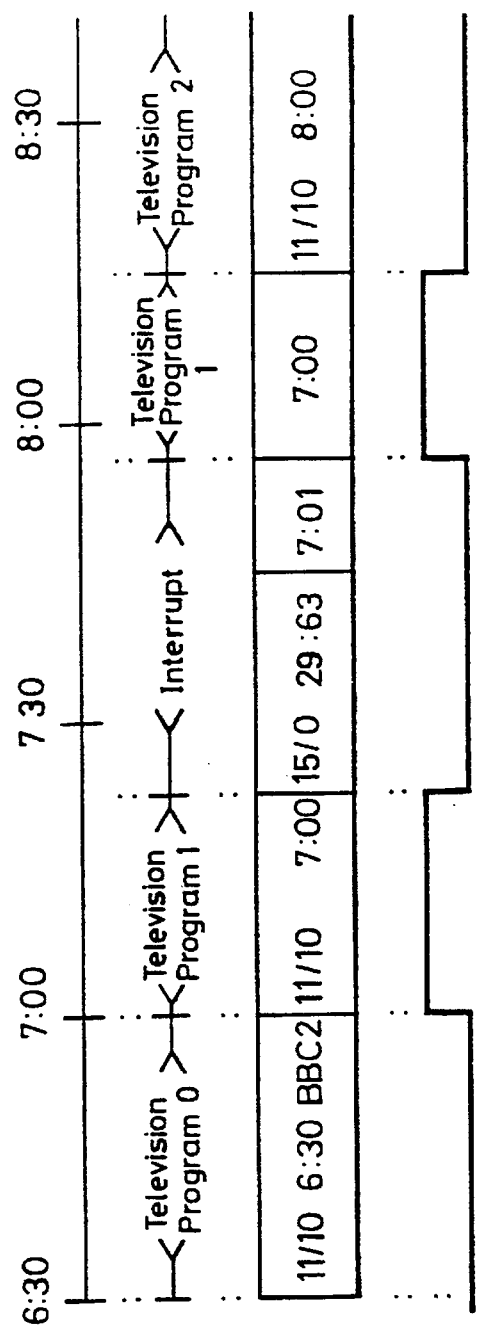
Figure 4:
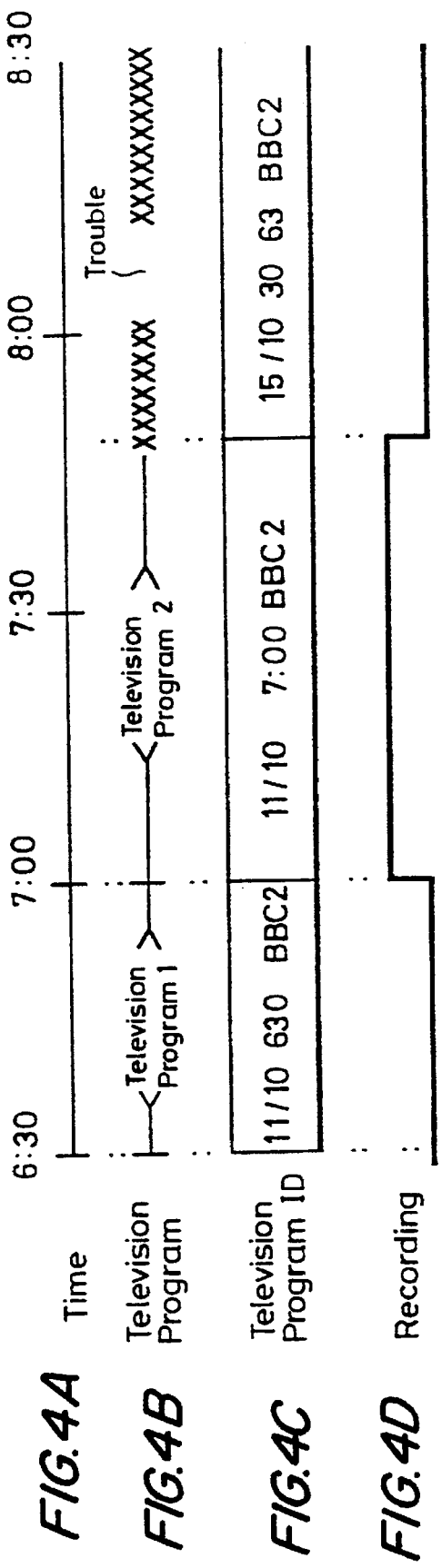
Figure 5:
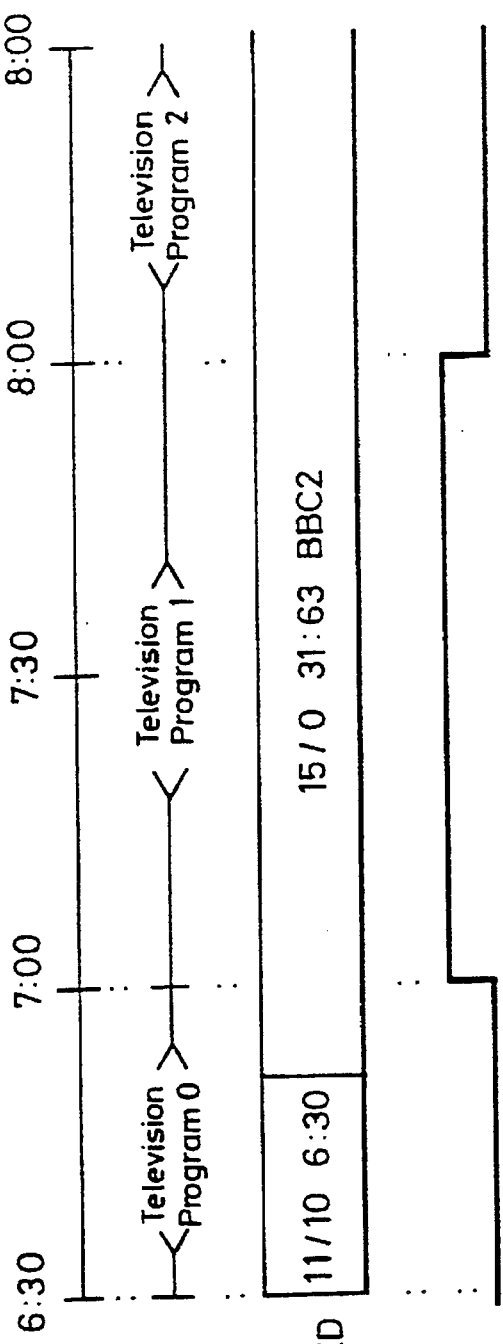
Figure 6:
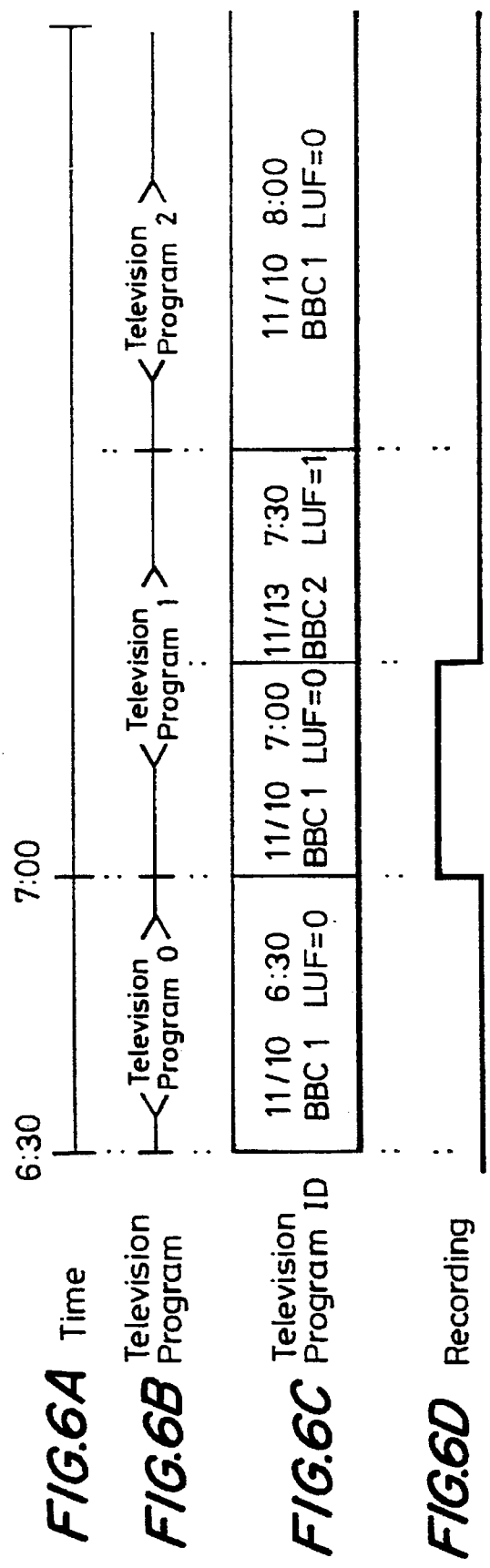
Figure 7:
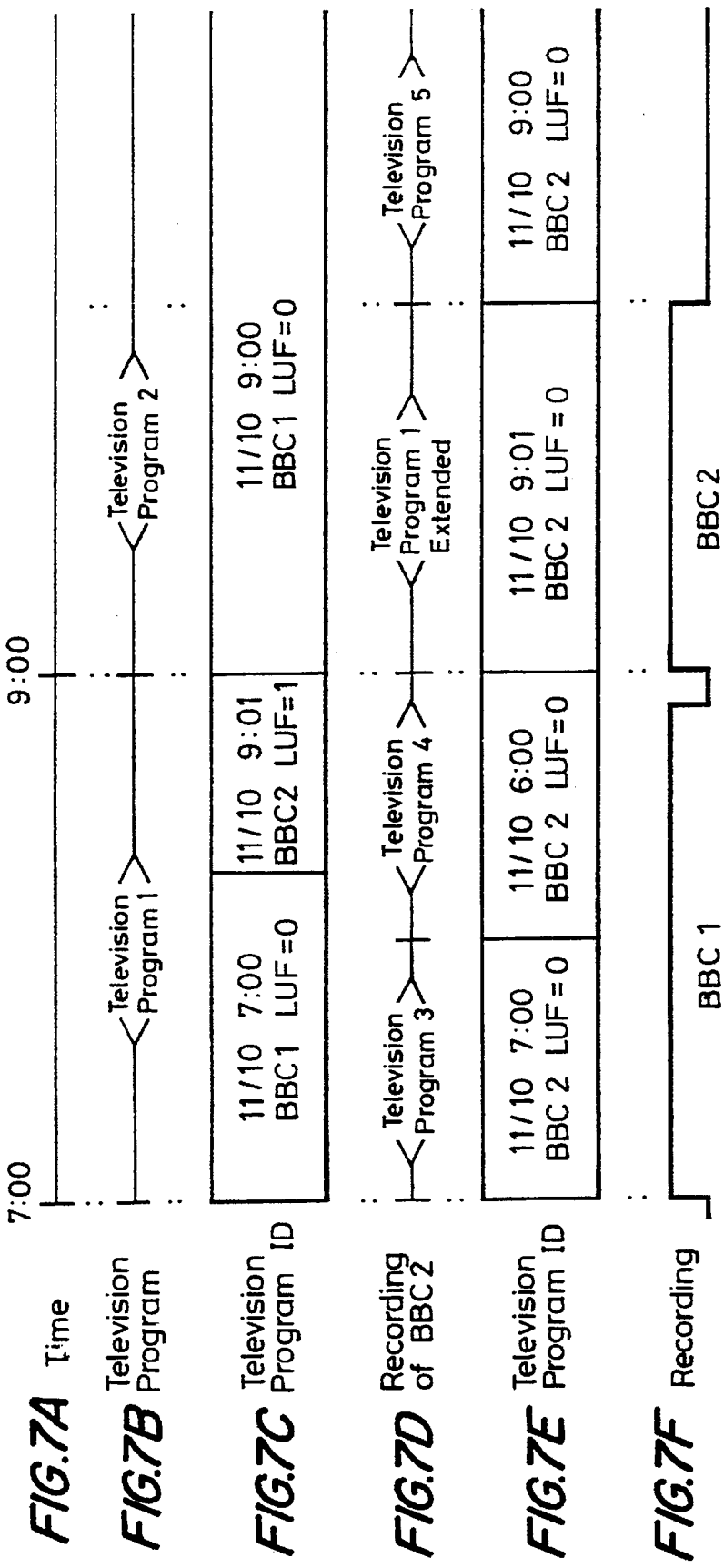
Figure 8:
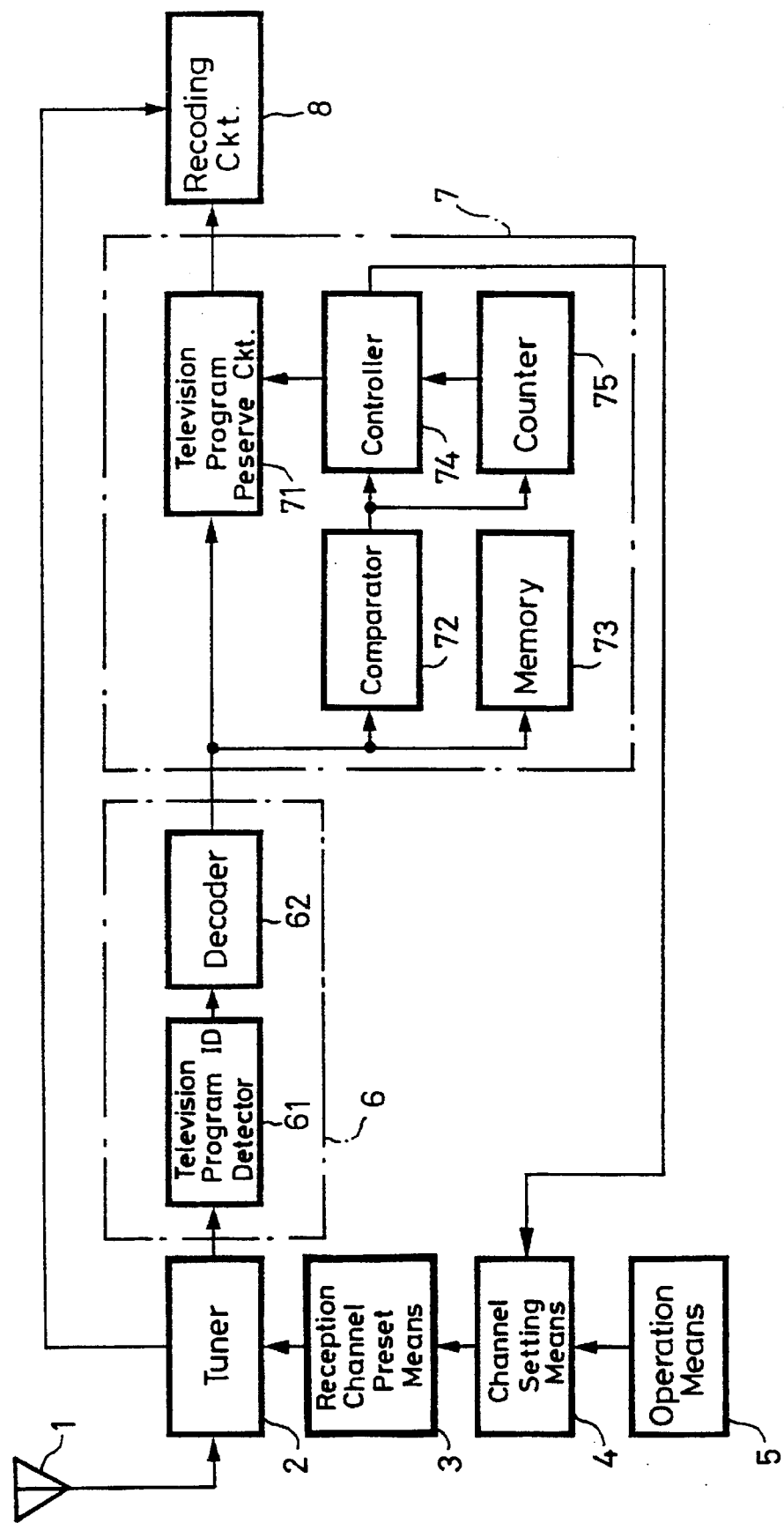
FIG. 8 is a schematic block diagram showing an arrangement of a broadcast reception apparatus according to an embodiment of the present invention.

As shown in FIG. 8, there is provided an antenna 1, and a signal received at the antenna 1 is supplied to a tuner 2. A reception channel preset means 3 is connected to the tuner 2 and a channel setting means 4 is connected to the reception channel preset means 3. When the channel setting means 4 is controlled by a signal supplied from an operation means 5, for example, the reception channel preset means 3 is selected by the channel setting means 4 and a signal set in the reception channel preset means 3 is supplied to the tuner, thereby a reception of a desired channel is effected.

The signal received by the tuner 2 is supplied to a PDC decoder 6. In the PDC decoder 6, the signal supplied thereto is supplied to a television program ID detector 61 and a signal from the detector 61 is supplied to a decoder 62, thereby data in the received signal transmitted as the television program ID is decoded.

The data decoded by the decoder 62 is supplied to a control microcomputer 7. In the microcomputer 7, the data from the decoder 62 is supplied to a television program reserve circuit 71 in which recording reserved data previously set by operation means (not shown) is changed when LUF="1", for example, is detected.

A network code is detected from the television program ID supplied from the decoder 62. The network code thus detected is supplied to a comparator 72 and the network code provided is supplied to a memory 73 when LUF="1" is detected. Then, the network code from the television program ID in the received signal and the network code memorized in the memory 73 are compared with each other by the comparator 72.

A compared result from the comparator 72 is supplied to a controller 74. Thus, the controller 74 sequentially supplies a channel-selection control signal to the channel setting means 4 while the network codes are not coincident. When the network codes are coincident with each other, a signal representing a reception channel provided at that very time is supplied to the television program reserve circuit 71.

A counter 75 counts the number with which the comparator 72 outputs the compared result. When the number counted by the counter 75 reaches a predetermined value or greater, a signal representing the channel provided before the channel is changed and supplied to the television program reserve circuit 71 in order to avoid an infinite loop and the television program reserve circuit 71 is disabled. A signal from the television program reserve circuit 71 is supplied to a recording circuit 8 which records video signals, such as a video signal from the tuner 2 or the like.

Figure 9:
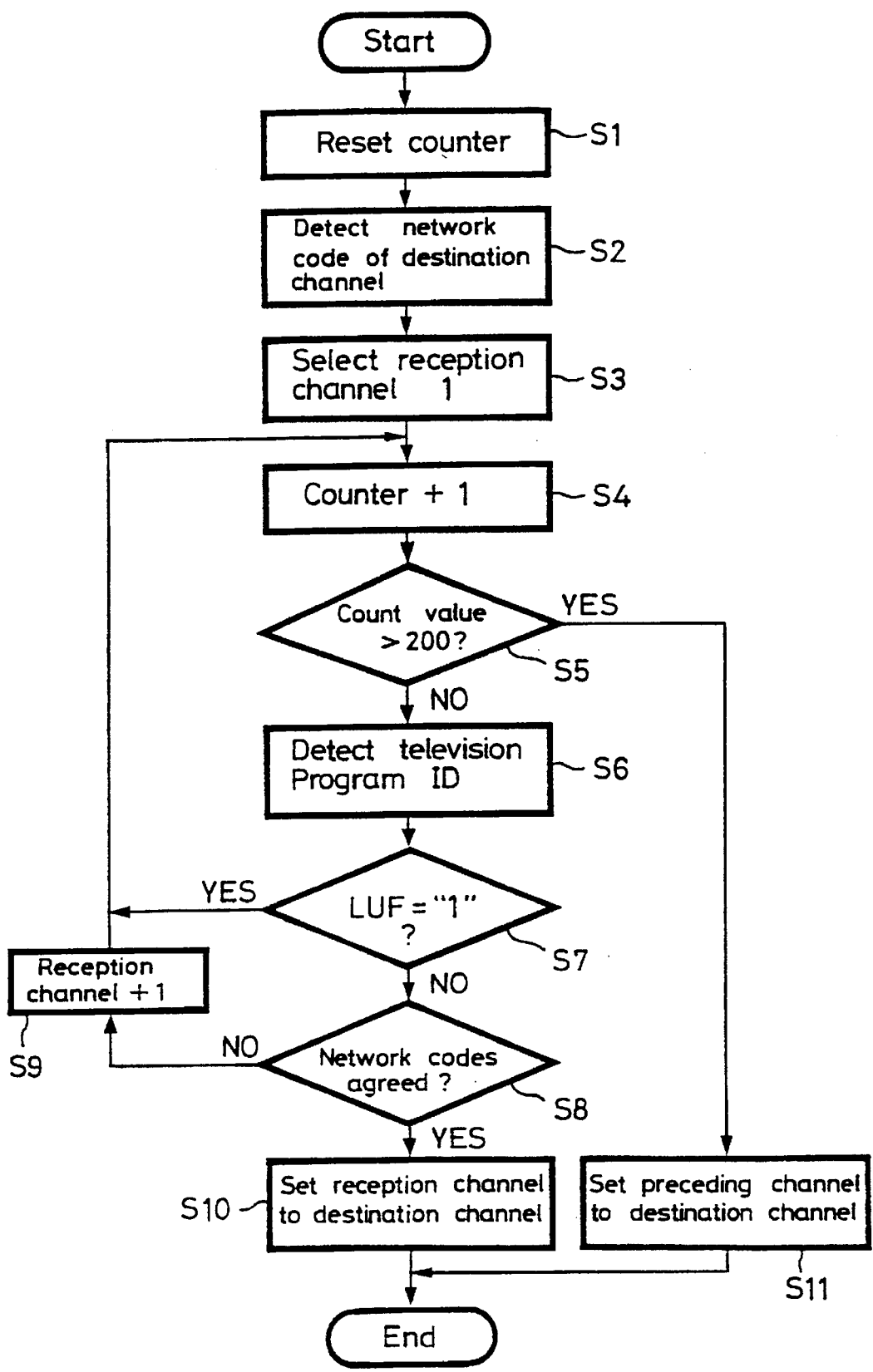
FIG. 9 is a flowchart to which reference will be made in explaining operation of a broadcast reception apparatus.

FIG. 9 is a flowchart showing the processing of the microcomputer 7. Referring to FIG. 9, following the destination channel determining process, a counter that is housed in the VCR, though not shown, is reset at step S1. Then, a network code of destination channel is detected at step S2, and a reception channel 1 is selected by the reception channel preset means 3 in step S3.

In the next step S4, "1" is added to the housed counter and the processing proceeds to the next decision step S5. It is determined in decision step S5 whether or not the count value of the housed counter is "200" or greater. If the count value is "200" or smaller as represented by a NO at decision step S5, then the processing proceeds to step S6, whereat the television program ID in the received signal is detected.

In the next decision step S7, it is determined whether or not the LUF in the detected television program ID is "1". If the LUF is "1" as represented by a YES at decision step S7, then the processing returns to step S4. If on the other hand a NO is output at decision step S7, then the processing proceeds to the next decision step S8. It is determined at decision step S8 whether or not the network code of the destination channel and the network code in the received television program ID agree with each other. If the network codes do not agree as represented by a NO at decision step S8, then the processing proceeds to step S9, wherein "1" is added to the reception channel, whereafter the processing is returned to step S4.

If on the other hand the network codes agree as represented by a YES at decision step S8, then the processing proceeds to step S10, wherein the reception channel provided at that time is set to the destination channel. Further, if the count value of the housed counter becomes greater than "200" as represented by a YES at decision step S5, then the processing proceeds to step S11, wherein the preceding channel is set to the destination channel. Then, the processing is ended.

As described above, according to the apparatus of the present invention, when the reception channel is changed, the preset channel is sequentially selected and ID codes are compared, whereby the changed reception channel can be detected with ease without using an extra memory or the like.

If the count value of the housed counter becomes greater than "200" as represented by a YES at decision step S5, in the next step S11, the preceding channel is set to the destination channel, thereby preventing the processing from entering an infinite loop.

Further, the processing operation, such as a timer-activated recording operation (reserve operation) or the like, are conventional and therefore need not be described herein. The present invention can be applied to the system, such as the VPS system implemented in Germany. Furthermore, although the PDC system allows a plurality of television program IDs to be transmitted simultaneously, in that case, the present invention can be carried out in accordance with the regulations of the system.

As described above, according to the apparatus of the present invention, when the reception channel is changed, the preset channel is sequentially selected and ID codes are compared, whereby the changed reception channel can be detected with ease without using an extra memory or the like.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A reception method in a broadcast reception apparatus including a tuner for receiving a broadcast signal into which a predetermined television program ID is inserted, detecting means for detecting said television program ID, comparing means for comparing a detected ID code, preset means for a reception channel, and channel setting means, comprising the steps of:

a first step of resetting a housed counter when a destination channel determining processing is started;

a second step of detecting a network code of a destination network code;

a third step of selecting a reception channel 1 of said preset means;

a fourth step of adding "1" to a count value of said housed counter;

a fifth step of detecting whether or not a counter value of said housed counter becomes larger than a predetermined value;

a sixth step of detecting a television program ID in a received signal when said count value of said housed counter is said predetermined value or smaller;

a seventh step of judging television program change information in said television program ID and returning the processing to said fourth step when said television program ID includes said television program change information;

an eighth step of determining whether or not the network code of said destination channel and the network code of said television program ID are agreed to each other if it is determined that said television program ID has no television program change information;

a ninth step of adding "1" to the reception channel if it is determined in said eighth step that said network codes do not agree and returning the processing to said fourth step and a tenth step of setting the reception channel to the destination channel if it is determined in said eighth step, that said network codes do agree.

2. Broadcast reception apparatus comprising:

a tuner for receiving a broadcast signal into which a predetermined television program ID code is inserted, wherein said television program ID code is associated with a respective television program and contains broadcasting schedule information composed of at least a network code representing the broadcast channel on which said program is transmitted, a broadcasting date representing the date said program is transmitted, a broadcasting time representing the time of day said program is transmitted, and an update flag indicating whether said television program ID code contains updated broadcasting schedule information;

detecting means for detecting said network code, said broadcasting date, said broadcasting time, and said update flag contained in said television program ID code;

comparing means for comparing a detected network code, a detected broadcasting date, and a detected broadcasting time to a pre-stored reception channel, a pre-stored broadcasting date, and a pre-stored broadcasting time, respectively, when said update flag is detected as being set;

preset means for presetting said apparatus to receive a television program, wherein said preset means pre-stores a reception channel corresponding to said broadcast channel on which the received television program is transmitted;

channel setting means for selecting said pre-stored reception channel on which said television program is transmitted at said pre-stored broadcasting time on said pre-stored broadcasting date;

time updating means for updating the pre-stored broadcasting time associated with a television program to be received by replacing the pre-stored broadcasting time with said detected broadcasting time, and for controlling said channel setting means to select said pre-stored reception channel on which said television program to be received is transmitted at said detected broadcasting time on said pre-stored broadcasting date when it is determined by the comparing means that said broadcasting time associated with said television program has been changed, thereby enabling said apparatus to correctly receive said television program even when said broadcasting time associated said television program is changed;

date updating means for updating said pre-stored broadcasting date associated with said television program to be received by replacing the pre-stored broadcasting date with said detected broadcasting date, for controlling said channel setting means to select said pre-stored reception channel on which said television program to be received is transmitted at said pre-stored broadcasting time on said detected broadcasting date when it is determined by the comparing means that said broadcasting date associated with said television program has been changed, thereby enabling said apparatus to correctly receive said television program even when said broadcasting date associated said television program is changed; and channel updating means for updating said pre-stored reception channel on which said television program to be received is transmitted by replacing the pre-stored reception channel with another reception channel corresponding to said detected network code, and for controlling said channel setting means to select said other reception channel corresponding to said detected network code at said pre-stored broadcasting time on said pre-stored broadcasting date when it is determined by the comparing means that the broadcast channel on which said television program is transmitted has been changed, thereby enabling said apparatus to correctly receive said television program even when said broadcast channel for said television program is changed.

3. The apparatus of claim 2, further comprising recording means in which a reserve recording is started and ended under the control of said detecting means.

4. The apparatus of claim 3, wherein said detecting means includes decoder means.

5. The apparatus of claim 4, further comprising counter means for limiting said comparing means to compare said television program ID codes a predetermined number of times within a predetermined time.

6. Broadcast reception and recording apparatus comprising:

a tuner for receiving a broadcast signal into which a predetermined television program ID code is inserted, wherein said television program ID code is associated with a respective television program and contains broadcasting schedule information composed of at least a network code representing the broadcast channel on which said program is transmitted, a broadcasting date representing the date said program is transmitted, a broadcasting time representing the time of day said program is transmitted, and an update flag indicating whether said television program ID code contains updated broadcasting schedule information;

detecting means for detecting said network code, said broadcasting date, said broadcasting time, and said update flag contained in said television program ID code;

comparing means for comparing a detected network code, a detected broadcasting date, and a detected broadcasting time to a pre-stored reception channel, a pre-stored broadcasting date, and a pre-stored broadcasting time, respectively, when said update flag is detected as being set;

preset means for presetting said apparatus to receive a television program, wherein said preset means pre-stores a reception channel corresponding to said broadcast channel on which the received television program is transmitted;

channel setting means for selecting said pre-stored reception channel on which said television program is transmitted at said pre-stored broadcasting time on said pre-stored broadcasting date;

recording means responsive to said television program ID code for recording said broadcast signals received by said tuner on the selected pre-stored reception channel at said pre-stored broadcasting time on said pre-stored broadcasting date;

time updating means for updating the pre-stored broadcasting time associated with a television program to be received by replacing the pre-stored broadcasting time with said detected broadcasting time, and for controlling said channel selecting means to select said pre-stored reception channel on which said television program to be received is transmitted at said detected broadcasting time on said pre-stored broadcasting date when it is determined by the comparing means that said broadcasting time associated with said television program has been changed, thereby enabling said apparatus to correctly receive and record said television program even when said broadcasting time associated said television program is changed;

date updating means for updating said pre-stored broadcasting date associated with said television program to be received by replacing the pre-stored broadcasting data with said detected broadcasting date, and for controlling said channel setting means to select said pre-stored reception channel on which said television program to be received is transmitted at said pre-stored broadcasting time on said detected broadcasting date when it is determined by the comparing means that said broadcasting date associated with said television program has been changed, thereby enabling said apparatus to correctly receive and record said television program even when said broadcasting date associated said television program is changed;

channel updating means for updating said pre-stored reception channel on which said television program to be received is transmitted by replacing the pre-stored reception channel with another reception channel corresponding to said detected network code, and for controlling said channel setting means to select said other reception channel corresponding to said detected network code at said pre-stored broadcasting time on said pre-stored broadcasting date when it is determined by the comparing means that the broadcast channel on which said television program is transmitted has been changed, thereby enabling said apparatus to correctly receive and record said television program even when said broadcast channel for said television program is changed.

7. The apparatus of claim 6, wherein said recording means is operable to start and end a reserve recording under the control of said detecting means.

8. The apparatus of claim 7, wherein said detecting means includes decoder means.

9. The apparatus of claim 8, further comprising counter means for limiting said comparing means to compare said television program ID codes a predetermined number of times within a predetermined time.

* * * * *